US009280365B2

(12) United States Patent
Jones et al.

(10) Patent No.: US 9,280,365 B2
(45) Date of Patent: Mar. 8, 2016

(54) SYSTEMS AND METHODS FOR MANAGING CONFIGURATION DATA AT DISCONNECTED REMOTE DEVICES (75) Inventors: Bryan Jones, Kariong (AU); Matt Palme, Sydney (AU); Stephen Quaill, Jamisontown (AU); Edward Cheung, Sydney (AU)

(73) Assignee: Honeywell International Inc., Morris Plains, NJ (US)

( * ) Notice: Subject to any disclaimer, the term of this patent is extended or adjusted under 35 U.S.C. 154(b) by 178 days.

(21) Appl. No.: 12/970,778

(22) Filed: Dec. 16, 2010

(65) Prior Publication Data
US 2011/0153791 A1 Jun. 23, 2011

(30) Foreign Application Priority Data
Dec. 17, 2009 (AU) ................................ 2009906141

(51) Int. Cl.
*G06F 15/177* (2006.01)
*G06F 9/445* (2006.01)
*H04L 12/24* (2006.01)
*G06F 9/44* (2006.01)
*G06F 7/04* (2006.01)

(52) U.S. Cl.
CPC .......... *G06F 9/44505* (2013.01); *H04L 41/082* (2013.01); *H04L 41/085* (2013.01); *H04L 41/0879* (2013.01)

(58) Field of Classification Search
CPC .............. H04L 29/06; H04L 29/08981; H04L 24/08072
USPC ....................................................... 709/221
See application file for complete search history.

(56) References Cited

U.S. PATENT DOCUMENTS

| 3,753,232 A | 8/1973 | Sporer |
| 3,806,911 A | 4/1974 | Pripusich |

(Continued)

FOREIGN PATENT DOCUMENTS

| CA | 2240881 | 12/1999 |
| CN | 1265762 A | 9/2000 |

(Continued)

OTHER PUBLICATIONS

"Certificate Validation Choices," CoreStreet, Inc., 8 pages, 2002.

(Continued)

*Primary Examiner* — Chris Parry
*Assistant Examiner* — Alan S Chou
(74) *Attorney, Agent, or Firm* — Seager, Tufte & Wickhem, LLP (57) ABSTRACT Described herein are systems and methods for managing configuration data. These are particularly directed towards the management of configuration data in disconnected remote devices of a host system. For example, this may be an access control environment having one or more connected access control devices (i.e. devices in communication with a central server), and one or more disconnected access control devices (i.e. devices operating without communication with the central server), the latter being regarded as disconnected remote devices. In overview, the present systems and methods make use of a versioning protocol to allow the reliable distribution of configuration data at the disconnected remote devices, this protocol operating to best ensure the propagation of the most current configuration data.

13 Claims, 4 Drawing Sheets (56) References Cited

U.S. PATENT DOCUMENTS

| | | |
|---|---|---|
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitmain et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,914,875 A | 6/1999 | Monta et al. |
| 5,915,473 A | 6/1999 | Ganesh et al. |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mchaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagashi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,283,489 B2 | 10/2007 | Palaez et al. |

(56) References Cited

U.S. PATENT DOCUMENTS

| | | | |
|---|---|---|---|
| 7,313,819 B2 | 12/2007 | Burnett et al. | |
| 7,321,784 B2 | 1/2008 | Serceki et al. | |
| 7,337,315 B2 | 2/2008 | Micali | |
| 7,343,265 B2 | 3/2008 | Andarawis et al. | |
| 7,353,396 B2 | 4/2008 | Micali et al. | |
| 7,362,210 B2 | 4/2008 | Bazakos et al. | |
| 7,376,839 B2 | 5/2008 | Carta et al. | |
| 7,379,997 B2 | 5/2008 | Ehlers et al. | |
| 7,380,125 B2 | 5/2008 | Di Luoffo et al. | |
| 7,383,158 B2 | 6/2008 | Krocker et al. | |
| 7,397,371 B2 | 7/2008 | Martin et al. | |
| 7,408,925 B1 | 8/2008 | Boyle et al. | |
| 7,487,538 B2 | 2/2009 | Mok | |
| 7,505,914 B2 | 3/2009 | McCall | |
| 7,542,867 B2 | 6/2009 | Steger et al. | |
| 7,543,327 B1 | 6/2009 | Kaplinsky | |
| 7,574,734 B2 | 8/2009 | Fedronic et al. | |
| 7,576,770 B2 | 8/2009 | Metzger et al. | |
| 7,583,401 B2 | 9/2009 | Lewis | |
| 7,586,398 B2 | 9/2009 | Huang et al. | |
| 7,600,679 B2 | 10/2009 | Kshirsagar et al. | |
| 7,634,662 B2 | 12/2009 | Monroe | |
| 7,661,603 B2 | 2/2010 | Yoon et al. | |
| 7,683,940 B2 | 3/2010 | Fleming | |
| 7,735,132 B2 | 6/2010 | Brown et al. | |
| 7,735,145 B2 | 6/2010 | Kuehnel et al. | |
| 7,796,536 B2 | 9/2010 | Roy et al. | |
| 7,818,026 B2 | 10/2010 | Hartikainen et al. | |
| 7,839,926 B1 | 11/2010 | Metzger et al. | |
| 7,853,987 B2 | 12/2010 | Balasubramanian et al. | |
| 7,861,314 B2 | 12/2010 | Serani et al. | |
| 7,873,441 B2 | 1/2011 | Synesiou et al. | |
| 7,907,753 B2 | 3/2011 | Wilson et al. | |
| 7,937,669 B2 | 5/2011 | Zhang et al. | |
| 7,983,892 B2 | 7/2011 | Anne et al. | |
| 7,995,526 B2 | 8/2011 | Liu et al. | |
| 7,999,847 B2 | 8/2011 | Donovan et al. | |
| 8,045,960 B2 | 10/2011 | Orakkan | |
| 8,089,341 B2 | 1/2012 | Nakagawa et al. | |
| 8,095,889 B2 | 1/2012 | DeBlaey et al. | |
| 8,199,196 B2 | 6/2012 | Klein et al. | |
| 8,316,407 B2 | 11/2012 | Lee et al. | |
| 8,509,987 B2 | 8/2013 | Resner | |
| 8,560,970 B2 | 10/2013 | Liddington | |
| 8,605,151 B2 | 12/2013 | Bellamy et al. | |
| 2002/0011923 A1 | 1/2002 | Cunningham et al. | |
| 2002/0022991 A1 | 2/2002 | Sharood et al. | |
| 2002/0046337 A1 | 4/2002 | Micali | |
| 2002/0118096 A1 | 8/2002 | Hoyos et al. | |
| 2002/0121961 A1 | 9/2002 | Huff | |
| 2002/0165824 A1 | 11/2002 | Micali | |
| 2002/0170064 A1 | 11/2002 | Monroe et al. | |
| 2003/0033230 A1 | 2/2003 | McCall | |
| 2003/0071714 A1 | 4/2003 | Bayer et al. | |
| 2003/0174049 A1 | 9/2003 | Beigel et al. | |
| 2003/0208689 A1 | 11/2003 | Garza | |
| 2003/0233432 A1 | 12/2003 | Davis et al. | |
| 2004/0062421 A1 | 4/2004 | Jakubowski et al. | |
| 2004/0064453 A1 | 4/2004 | Ruiz et al. | |
| 2004/0068583 A1 | 4/2004 | Monroe et al. | |
| 2004/0087362 A1 | 5/2004 | Beavers | |
| 2004/0205350 A1 | 10/2004 | Waterhouse et al. | |
| 2005/0138380 A1 | 6/2005 | Fedronic et al. | |
| 2005/0200714 A1 | 9/2005 | Marchese | |
| 2006/0017939 A1 | 1/2006 | Jamieson et al. | |
| 2006/0059557 A1 | 3/2006 | Markham et al. | |
| 2007/0109098 A1 | 5/2007 | Siemon et al. | |
| 2007/0132550 A1 | 6/2007 | Avraham et al. | |
| 2007/0171862 A1 | 7/2007 | Tang et al. | |
| 2007/0268145 A1 | 11/2007 | Bazakos et al. | |
| 2007/0272744 A1 | 11/2007 | Bantwal et al. | |
| 2008/0086758 A1 | 4/2008 | Chowdhury et al. | |
| 2008/0104142 A1* | 5/2008 | Oh et al. | 707/203 |
| 2008/0173709 A1 | 7/2008 | Ghosh | |
| 2008/0272881 A1 | 11/2008 | Goel | |
| 2009/0018900 A1 | 1/2009 | Waldron et al. | |
| 2009/0080443 A1 | 3/2009 | Dziadosz | |
| 2009/0086692 A1 | 4/2009 | Chen | |
| 2009/0097815 A1 | 4/2009 | Lahr et al. | |
| 2009/0121830 A1 | 5/2009 | Dziadosz | |
| 2009/0167485 A1 | 7/2009 | Birchbauer et al. | |
| 2009/0168695 A1 | 7/2009 | Johar et al. | |
| 2009/0258643 A1 | 10/2009 | McGuffin | |
| 2009/0266885 A1 | 10/2009 | Marcinowski et al. | |
| 2009/0292524 A1 | 11/2009 | Anne et al. | |
| 2009/0292995 A1 | 11/2009 | Anne et al. | |
| 2009/0292996 A1 | 11/2009 | Anne et al. | |
| 2009/0328152 A1 | 12/2009 | Thomas et al. | |
| 2009/0328203 A1 | 12/2009 | Haas | |
| 2010/0026811 A1 | 2/2010 | Palmer | |
| 2010/0036511 A1 | 2/2010 | Dongare | |
| 2010/0037216 A1* | 2/2010 | Carcerano et al. | 717/173 |
| 2010/0148918 A1 | 6/2010 | Gerner et al. | |
| 2010/0164720 A1 | 7/2010 | Kore | |
| 2010/0220715 A1 | 9/2010 | Cherchali et al. | |
| 2010/0268844 A1* | 10/2010 | Quinlan et al. | 709/238 |
| 2010/0269173 A1 | 10/2010 | Srinvasa et al. | |
| 2011/0038278 A1 | 2/2011 | Bhandari et al. | |
| 2011/0043631 A1 | 2/2011 | Marman et al. | |
| 2011/0071929 A1 | 3/2011 | Morrison | |
| 2011/0115602 A1 | 5/2011 | Bhandari et al. | |
| 2011/0133884 A1 | 6/2011 | Kumar et al. | |
| 2011/0167488 A1 | 7/2011 | Roy et al. | |
| 2011/0181414 A1 | 7/2011 | G et al. | |
| 2012/0096131 A1 | 4/2012 | Bhandari et al. | |
| 2012/0106915 A1 | 5/2012 | Palmer | |
| 2012/0121229 A1 | 5/2012 | Lee | |
| 2012/0133482 A1 | 5/2012 | Bhandari et al. | |
| 2012/0233681 A1* | 9/2012 | Adams et al. | 726/7 |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003074942 | 3/2003 |
| JP | 2003240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | 0076220 A1 | 12/2000 |
| WO | WO 01/42598 | 6/2001 |
| WO | 0157489 | 8/2001 |
| WO | WO 01/60024 | 8/2001 |
| WO | WO 02/32045 | 4/2002 |
| WO | WO 02/091311 | 11/2002 |
| WO | 03090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | 2006126974 A1 | 11/2006 |
| WO | 2007043798 A1 | 4/2007 |
| WO | WO 2008/045918 | 4/2008 |
| WO | 2008144803 | 12/2008 |
| WO | WO 2010/039598 | 4/2010 |
| WO | WO 2010/106474 | 9/2010 |

OTHER PUBLICATIONS

"CoreStreet Cuts the PKI Gordian Knot," Digital ID World, pp. 22-25, Jun./Jul. 2004.

"Distributed Certificate Validation," CoreStreet, Ltd., 17 pages, 2006.

(56) References Cited

OTHER PUBLICATIONS

"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
U.S. Appl. No. 13/292,992, filed Nov. 9, 2011.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
U.S. Appl. No. 13/533,334, filed Jun. 26, 2012.
"Keyfast Technical Overview," Corestreet Ltd, 21 pages, 2004.
U.S. Appl. No. 14/129,086, filed Dec. 23, 2013.

* cited by examiner

SYSTEMS AND METHODS FOR MANAGING CONFIGURATION DATA AT DISCONNECTED REMOTE DEVICES

This application claims priority to Australian Patent Application No. 2009906141, filed on Dec. 17, 2009, entitled "SYSTEM AND METHODS FOR MANAGING CONFIGURATION DATA AT DISCONNECTED REMOTE DEVICES", which is incorporated herein by reference.

FIELD OF THE INVENTION

The present invention relates to data management, and more particularly to systems and methods for managing configuration data at disconnected remote devices. Embodiments of the invention have been particularly developed for reliably providing configuration data to disconnected access control devices and the like, and the present disclosure is primarily focused accordingly. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. It is also known for such an environment to include:

Connected access control devices, which are connected to a network and communicate with a central administration server over that network.

Disconnected access control devices, which are not connected to the network. For example, in some cases an access control device, due to its location, cannot be provided with a network connection (either wired or wireless).

Typically, there is a need to periodically provide modified configuration data to access control devices. This is a relatively straightforward process in the case of a connected access control device—the modified configuration data is delivered by the administration server to the device over the network. However, providing modified configuration data to disconnected access control devices presents practical difficulties. One option is to transport the disconnected device to a location where it can receive the configuration data from a computational device, or where it can access an available network connection. However, in many instances, the device is not easily transportable.

As such, a more appropriate technique is to transport a portable manual update device to the disconnected access control device. Manual update devices may include the likes of portable computers (including cell phones and PDAs), smartcards, USB drives, and the like.

Similar problems present themselves in other environments where a plurality of disconnected devices (such a parking meters and the like) need to be configured for operation as a collective, although there is no available common network connection. For the present purposes, such disconnected devices are referred to as "disconnected remote devices".

Traditionally, applying configuration data to disconnected remote devices via manual update devices has involved "blindly" applying whatever data is stored on those manual update devices to the disconnected remote devices. When there are many such manual update devices (for example ten users with ten different update devices) and only some percentage of these have the most current configuration, it becomes unreliable to know what data has been applied to the disconnected remote devices. Consider scenarios where, for instance, an administrator decides to change the parking rate at a number of parking meters. On Monday user X starts applying this to the meters as he moves around on foot, and later that week user Y also goes past these meters (but with a different manual update device). If user X and user Y do not carry the same information on their manual update devices, the master system has no way of knowing what has been applied. Traditionally this has been solved by manual processes that force each manual update device to carry the same information, which are obviously error prone. Furthermore, such a solution does not scale readily.

These concerns are not limited to disconnected access control devices; they apply to disconnected remote device generally, being devices that operate as a collective within the context of a host system, although they are not in communication with that host system.

It follows that there is a need in the art for improved systems and methods for managing configuration data in disconnected remote devices.

SUMMARY

It is an object of the present invention to overcome or ameliorate at least one of the disadvantages of the prior art, or to provide a useful alternative.

One embodiment provides a method, performable by a disconnected remote device of a host system, for managing configuration data, the method including the steps of:

commencing communication with a manual update device that carries configuration data;

determining version information for the configuration data carried by the manual update device;

comparing the version information of the configuration data carried by the manual update device with version information of configuration data applied by the disconnected remote device;

in the case that the version information for the configuration data carried by the manual update device supersedes version information of configuration data applied by the disconnected remote device, selectively applying the configuration data carried by the manual update device to the disconnected remote device;

in the case that the configuration data carried by the manual update device is successfully applied to the disconnected remote device, writing data indicative of the successful application to the manual update device for subsequent propagation in the host system; and in the case that the version information for the configuration data carried by the disconnected remote device supersedes version information of configuration data applied by the manual update device, selectively applying the configuration data carried by the disconnected remote device to the manual update device for subsequent propagation.

One embodiment provides a disconnected remote device configured for operation as part of a host system without a communication channel to the host system, the disconnected remote device including:

a communications port for interacting with a manual update device that carries configuration data;

a memory module for maintaining software instructions; and a processor for executing the software instructions;

wherein the disconnected remote device is configured to:

determine version information for the configuration data carried by the manual update device;

compare the version information of the configuration data carried by the manual update device with version information of configuration data applied by the disconnected remote device;

in the case that the version information for the configuration data carried by the manual update device supersedes version information of configuration data applied by the disconnected remote device, selectively apply the configuration data carried by the manual update device to the disconnected remote device;

in the case that the configuration data carried by the manual update device is successfully applied to the disconnected remote device, provide an instruction for writing data indicative of the successful application to the manual update device for subsequent propagation in the host system; and in the case that the version information for the configuration data carried by the disconnected remote device supersedes version information of configuration data applied by the manual update device, selectively apply the configuration data carried by the disconnected remote device to the manual update device for subsequent propagation.

One embodiment provides a method for managing configuration data in a host system including one or more connected devices that are connected to a host system network and one or more disconnected remote devices that are not connected to the host system network, the method including:

at a disconnected remote device, reading configuration data from a manual update device, and based on a version control protocol either selectively applying the read configuration data to the disconnected remote device or applying configuration data stored at the disconnected remote device to the manual update device, and in the case that the read configuration data is selectively applied writing data indicative of that application to the manual update device; and at a connected device, reading from the manual update device data indicative of successful application of configuration data to one or more disconnected remote devices, and propagating that data to a central controller of the host system.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing configuration data. These are particularly directed towards the management of configuration data in disconnected remote devices of a host system. For example, this may be an access control environment having one or more connected access control devices (i.e. devices in communication with a central server), and one or more disconnected access control devices (i.e. devices operating without communication with the central server). In overview, the systems and methods considered herein make use of a versioning protocol to allow the reliable distribution of configuration data to the disconnected remote devices, this protocol operating to best ensure the propagation of the most current configuration data.

Although the present disclosure focuses primarily on the example of disconnected access control devices in an access control environment, the invention is by no means limited as such, and rinds application in the context of disconnected remote devices generally. The term "disconnected remote device" refers to a device that is configured to operate as part of a host system based on centrally defined configuration data, but in absence of a connection to the central server of the host system. Other than access control devices, examples include the likes of street light controllers, parking meters, vending machines, and the like.

One embodiment provides a method, performable by a disconnected remote device of a host system, for managing configuration data. The method includes commencing communication with a manual update device that carries configuration data. Based on this communication, the method includes determining version information for the configuration data carried by the manual update device. A comparison is performed, comparing the version information of the configuration data carried by the manual update device with version information of configuration data applied by the disconnected remote device. In the case that the version information for the configuration data carried by the manual update device supersedes version information of configuration data applied by the disconnected remote device, the method includes selectively applying the configuration data carried by the manual update device to the disconnected remote device in the case that the configuration data carried by the manual update device is successfully applied to the disconnected remote device, the method includes writing data indicative of the successful application to the manual update device for subsequent propagation in the host system. In the case that the version information for the configuration data carried by the disconnected remote device supersedes version information of configuration data applied by the manual update device, the method includes selectively applying the configuration data carried by the disconnected remote device to the manual update device for subsequent propagation.

System Level Overview—Access Control Environment

Figure 1:
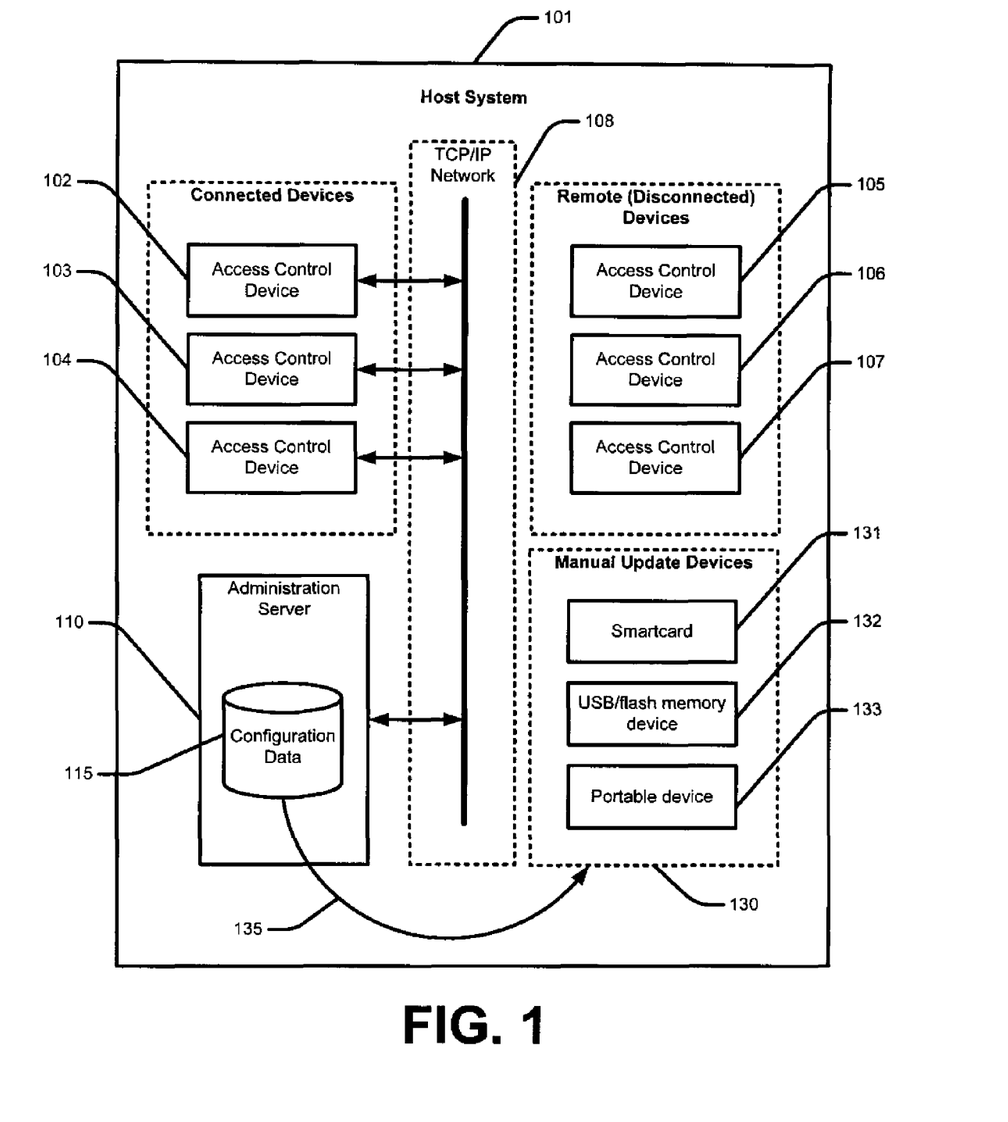
FIG. 1 schematically illustrates an access control environment according to one embodiment.

FIG. 1 schematically illustrates an access control environment 101 according to one embodiment. Environment 101 includes connected access control devices 102 to 104 and disconnected access control devices 105 to 107. The primary point of difference between the connected access control devices and the disconnected access control devices is that the former are connected to a network 108, (such as a TCP/IP or other network) whilst the latter are not. An administration server 110 is also connected to network 108, and the connected access control devices are able to communicate with this administration server over the network. Administration server 110 includes a database 115 for maintaining configuration data. Although server 110 is schematically illustrated as a single component, in some cases it is defined by a plurality of distributed networked components.

For the sake of the present disclosure, it is assumed that each of access control devices 102 to 107 include similar hardware and software components, and that each device is configured to progress between a connected state and a disconnected state depending on whether or not a connection to network 108 and central administration server 110 is available. However, in other embodiments a variety of different access control devices are used. For example, in some embodiments the access control devices are designed, from a hardware perspective, to allow/deny control to a variety of different locations or functionalities.

For the present purposes, disconnected devices 105 to 107 are regarded as being disconnected devices of a host system (the host system being access control environment 101). Although the present embodiments are primarily described by reference to an access control environment, the present technology is equally applicable to other systems having disconnected remote devices, where the devices are configured to operate as a collective in the context of a host system, in spite of an inability to communicate over a common network In the context of the present disclosure, the term "access control device" refers generally to any device having an "access control" functionality. That is, any device with which a user interacts to gain access to a physical region or virtual functionality. An access control device includes hardware and software components. Common examples include devices that control locking mechanisms on doors or other barriers. However, access control devices are also used for purposes such as activating lighting in a room, controlling access to a vehicle (for example verifying a person is permitted to board a bus), the vending of products, parking meters, and so on.

There is mention in the present disclosure of an access control device for operation in an access control system including a central server, one or more disconnected access control devices, and one or more connected access control devices. This compatibility distinguishes an access control device from an alternate form of device (for example a traditional ticket machine located on a bus or the like) in the sense that all devices are configured through a common system for complementary interaction and functionality.

Environment 101 also includes manual update devices 130. These are portable devices used to transport configuration data to disconnected devices. Examples include, but are not limited to, the following:

Smartcards 131. As presently described, environment 101 makes use of smartcards as access control tokens (that is, a user presents a smartcard to an access control device in order to access a controlled functionality). In some embodiments such smartcards (or other non-standard smartcards) are used to carry configuration data to disconnected devices. By way of example, technology for updating configuration data at access control devices via smartcards is disclosed in PCT/AU2008/000717.

USB and other portable memory devices 132. These are connected to a disconnected device, which reads data maintained thereon and identifies configuration data, which is selectively pulled.

Portable devices 133, which may include the likes of notebook computers, PDAs, mobile telephones, or other portable devices having a memory module coupled to a microprocessor. These communicate with disconnected devices via a wired or wireless link.

There may be multiple forms of manual update device used in environment 101. For example, configuration data may be deployed on smartcards, PDAs, and so on.

As indicated by arrow 135, configuration data from database 135 is provided to the manual update devices. The manner by which this data is provided varies between embodiments. For example, in some cases the data is written to the devices via a specialized component (for example an administration PC). In other cases the data is written to the manual update devices by one or more connected access control devices (either automatically based on a set of pre-existing rules, or following a user request).

Access Control Device

Figure 2:
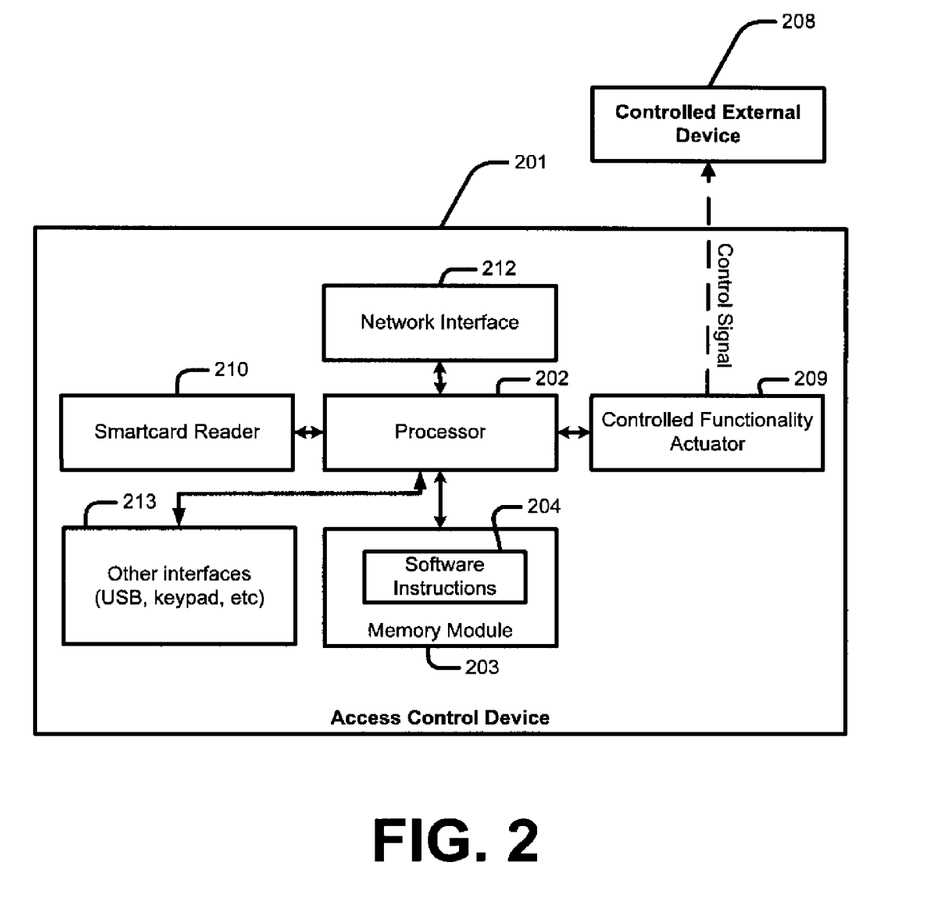
FIG. 2 schematically illustrates an access control device according to one embodiment.

FIG. 2 schematically illustrates an access control device according to one embodiment, in the form of access control device 201. Device 201 is configurable for integration into an access control environment such as environment 101 of FIG. 1. Various components of device 201 are omitted in other embodiments, where the functionality of those components is not required for the purposes of functionality described herein.

Access control device 201 includes a processor 202 coupled to a memory module 203. Memory module 203 carries software instructions 204 which, when executed on processor 202, allow access control device 201 to perform various methods and functionalities described herein.

In the present example, access control device 201 is configured for selectively granting access to a controlled functionality. In particular, processor 201 is coupled to a controlled functionality actuator 209. In the present example actuator 209 is coupled to a controlled external device 208. For example, in one embodiment actuator 209 locks and/or unlocks an external device in the form of a door. In another example the controlled functionality is notional, such as permission to board a bus. In one such example, the controlled functionality actuator provides a tone and/or light to indicate that access is granted.

A user wishing to gain access to the controlled functionality presents an access token to device 201. In the present example, the token takes the form of a smartcard, which is presented to a smartcard reader 210, which is also coupled to processor 201. Upon presentation of the smartcard, processor 201 performs an authorization/authentication process to determine whether or not access should be granted. In the event that the authorization/authentication process is successful, actuator 209 grants access. If the process is unsuccessful, actuator 209 denies access (achieved optionally either by inactivity or positive action).

The process whereby a user presents a smartcard (or other token), and the token is read and data processed, is presently referred to as an access transaction.

The nature of card reader present varies between embodiments depending on the nature of access card that is used in a given access control environment. In the embodiment of FIG. 2, access cards are in the form of smartcards, and reader 210 is a smartcard reader. In further embodiments access codes are used rather than access cards, in which case the reader includes an interface for entering an access code. In some embodiments a combination of these approaches are used. However, smartcards provide advantages in the sense that they include a memory storage allowing an access control device to both read data from the smartcard and write data to the smartcard. Various embodiments of the present invention leverage the ability to write data to smartcards for facilitating integration of disconnected devices in an access control environment.

Access control device 201 is presently configured to operate as a connected access control device or a disconnected access control device, depending on whether a connection to a central administration server is available. To this end, in the present embodiment, device 201 includes a network interface 212 (such as a Ethernet or other wired/wireless network interface) coupled to processor 202 for allowing access control device 201 to communicate over a network (such as network 108 of FIG. 1). In the present embodiment access control device 201 is configured for operation in either a connected state (with connection to the network and administration server) or a disconnected state (without connection to the network and server). In other embodiments device 201 is configured only to operate in a disconnected state, and in such embodiments interface 212 is optionally omitted.

Device 201 includes additional interfaces 213, such as a USB interface, Bluetooth adapter, or the like. These are optionally utilized for allowing communication between device 201 and a manual update device that is not configured to connect via the smartcard reader or network interface. Other interfaces, such as keypads, biometric scanners, and the like may also be used.

Configuration Data Distribution Method

Figure 3:
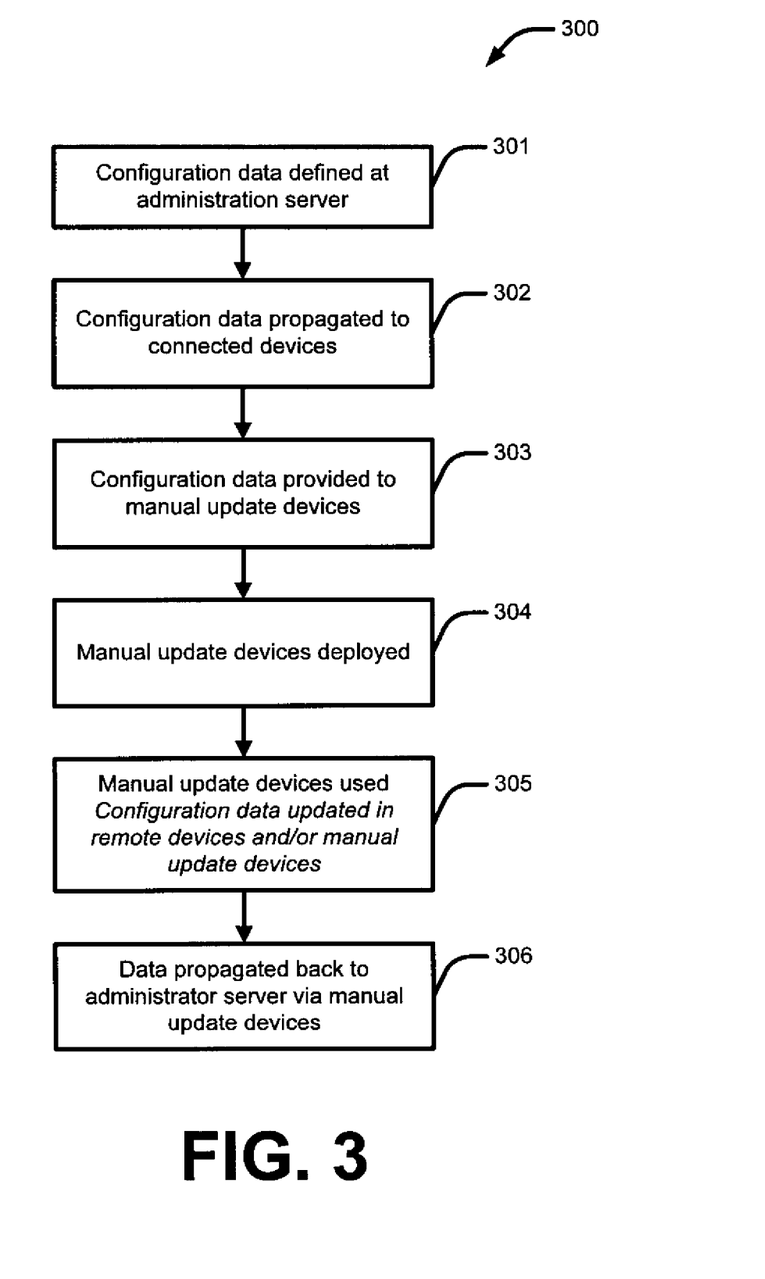
FIG. 3 schematically illustrates a method according to one embodiment.

FIG. 3 illustrates a method 300 for reliably distributing configuration data. As context, each device (remote or otherwise) operates based on configuration data. In some embodiments, the total configuration data for an access control device is able to be broken down into individual aspects. That is, for each access control device, the configuration data is made up of one or more aspects of configuration data. For example, in some embodiments the aspects include, but are not limited to, the following:

Access configuration data. For example, in some embodiments this aspect of configuration data includes data indicative of access permissions for various users/cards, and so on.

Hardware configuration data, such as firmware and/or other hardware drivers.

Scheduling data. In some embodiments an access control device is scheduled such that it behaves differently at different times. For example, in one scenario the level of access permission required on a weekday is different to that required on a weekend or public holiday. In some cases, access control devices are scheduled on a seven-day cycle, and scheduling data concerning public holidays or other unusual days needs to be provided on a periodic basis.

Threat level data, for example where threat levels are applied across access control devices.

Pricing information, rules, and so on.

Any reference to "configuration data" should be read as "one or more aspects of configuration data". That is, the term should be read broadly enough to encompass the possibility of a single aspect of configuration data (for example a set of pricing information) though to a full set of configuration data for a device.

Administration server 110 is used to deliver configuration data for access control devices 102 to 107, however, it will be appreciated that the server is only able to deliver such information to connected access control devices 102 to 104 via network 108. As such, other methods are required to allow the provision of configuration data to disconnected access control devices 105 to 107, and some embodiments of the present invention provide such methods. For example, FIG. 3 illustrates a method 200 for providing one or more aspects of configuration data to a disconnected access control device, as discussed below.

Step 301 includes defining configuration data at the central server. For example, a user interacts with a software application that allows for configuration data to be defined, modified, or the like. This software application in some embodiments allows a user to specify to which devices the configuration data is to be applied. Each set of configuration data is provided with an identifier to allow for version control. For example, in one embodiment each set of configuration data is provided with an identifier in the form XXX-YYYY, where XXX defines the nature of configuration (that is the aspect of configuration it affects) and YYYY is an incremented counter for allowing version control and comparison (i.e. the counter increments for each version created, allowing simple determination of which of two sets of configuration data is newer). This is exemplary only, and other approaches for version control may also be used. In some cases the XXX component is omitted, and determination of versions is simply based on comparing an incrementing counter type identifier for a proposed set of configuration data with a corresponding identifier for the data that propose set would replace. Other approaches, including timestamps and the like, may also be used.

Where relevant, configuration data is propagated to connected devices at step 302. It will be appreciated that this step only occurs where data is intended for connected devices, and connected devices exist within the relevant environment. In some embodiments there are only disconnected remote devices, and step 302 is omitted.

Step 303 includes providing the configuration data to one or more manual update devices. This may be performed at an administration server, or via a special procedure at one or the connected devices. In general terms, each device is provided with one or more data files indicative of the configuration data and indicative of rules concerning the application of that configuration data.

The manual update devices are deployed at 304. For example, the manual update devices are provided to persons responsible for carrying out the updating, and physically taken to the disconnected remote devices. In some embodiments configuration data is loaded onto access control smartcards by connected devices upon the presentation of those smartcards to connected devices, thereby to assist in data propagation simply by cardholder movements and interactions.

Step 305 includes the use of manual update devices. In overview, a user connects a manual update device to a disconnected remote device, with the nature of connection depending on the form of manual update device being used. This results in a process such as that described further below in relation to FIG. 4.

Step 306 includes a back-propagation method whereby the results of manual configuration data updates are propagated back to the central server via manual update devices. This is discussed further below.

Disconnected Remote Device Manual Update Procedure

Figure 4:
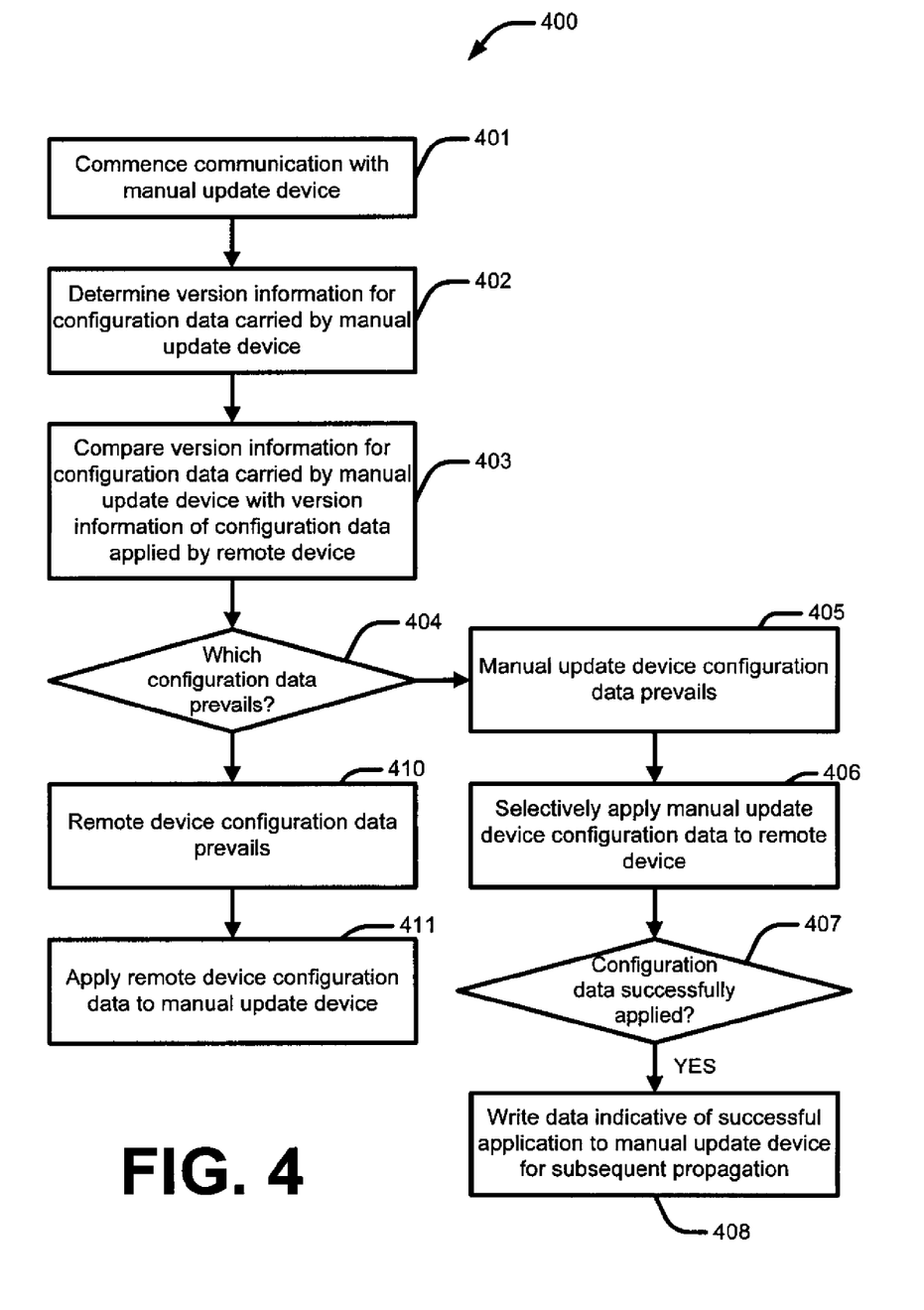
FIG. 4 schematically illustrates a method according to one embodiment.

A key element of the technology described herein is that a disconnected remote device is able to autonomously make a decision as to whether configuration data carried by a manual update device should be applied. In this regard, FIG. 4 illustrates a method 400 performed by a disconnected remote device. This method is performed on the basis of software instructions carried by the disconnected remote device, for example instructions embodied in computer executable code maintained on a non-transitive storage medium.

Step 401 includes commencing communication with a manual update device. In practice, the manual update device connects to the disconnected remote device (optionally via a wired or wireless connection), and the disconnected remote device determines that configuration data is present on the manual update device. The disconnected remote device then adopts a mode of operation that allows the review and selective application of configuration data.

Step 402 includes determining version information for configuration data carried by the manual update device. As noted above, each set of configuration data is provided with an identifier which allows it to be compared in age with like configuration data (for example based on a timestamp, incrementing counter, or the like). Step 403 includes comparing the version information for configuration data carried by the manual update device with version information for configuration data currently applied by the disconnected remote device. Based on this comparison, a determination is made at decision 404 to determine based on the version information which set of configuration data should prevail (i.e. which is newer/supersedes the other). Based on this:

In the event that the configuration data carried by the manual update device prevails over the configuration data currently applied by the disconnected remote device, the method progresses to 405.

In the event that the configuration data currently applied by the disconnected remote device prevails over the configuration data carried by the manual update device, the method progresses to 410.

Considering initially the case where the method progresses to 405, step 406 subsequently includes selectively applying the configuration data carried by the manual update device to the disconnected remote device. For example, the configuration data is read into memory of the disconnected remote device, installed, and applied. The application is selective in the sense that it is only performed in the case that certain predefined conditions are met. For example, step 406 may include taking a hash of the configuration data prior to application, and only applying the data it if it is complete. The disconnected remote device may also check what is present on the manual update device with its loaded data of that data to confirm that the transfer has been complete.

Step 407 includes determining whether the configuration data has been successfully applied to the disconnected remote device. In the event that there was successful application of configuration data, data indicative of that successful application is written to the manual update device for subsequent propagation back to the host system. For example, step 407 may include writing a data file to the remote update device, or updating a table on the manual update device, to specify the disconnected remote device to which configuration data was applied, and version information for the configuration data that was applied. This is optionally combined with other data, such as a timestamp or the like. The data is propagated back to the host system at a later stage when the manual update device is connected to that system (for example either subject to connection with a connected device, such as an access control device, or an administration terminal).

Considering the case where the method progresses to from 404 to 410, step 411 subsequently includes applying the configuration data currently applied to the disconnected remote device configuration data to manual update device. That is, the configuration data carried by the disconnected remote device is replaced by the configuration data applied by the disconnected remote device. In this manner, following step 411, the remote update device carries more up-to-date configuration data than it did previously. This is a significant result: it essentially means that most recent configuration propagates itself around the environment, often negating the need for all manual update devices to need to return to the host system to collect each new set of configuration data.

In the case that the remote update device carries multiple sets of configuration data (relating to different configurationally aspects), method 400 is optionally performed repeatedly in resects of the multiple individual sets of data.

Conclusions and Interpretation

It will be appreciated that the present disclosure provides for various systems and methods for configuring access control devices, particularly disconnected access control devices, which are advantageous in light of what is known in the art.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions, e.g., a computer program that are for execution on one or more processors, e.g., one or more processors that are part an information system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method performed by an access control device of a host access control system, for managing configuration data, the method comprising the steps of:
the access control device determining whether it has a network connection to a server device of the host access control system;
the access control device, in response to determining that it does not have a network connection to a server device of the host access control system, adopting a disconnected mode of operation;
the access control device reading an access control smartcard, wherein the access control smartcard carries data comprising: (i) user credential data configured to enable an authorization/authentication process to determine whether or not access should be granted in response to reading of the access control smartcard; and (ii) configuration data including threat level data;
the access control device, in response to reading the access control smartcard, performing an automated process comprising:
(a) reading the configuration data including threat level data from the access control smartcard, wherein the threat level data is a form of configuration data, wherein the configuration data including threat level data, when successfully applied by the access control device, is used by the access control device to determine at least part of the functionality of the remote device when operated in the disconnected mode, including threat-level specific functionality of a given authorization/authentication process to determine whether or not access should be granted;
(b) determining version information for the configuration data including threat level data carried by the access control smartcard;
(c) comparing the version information of the configuration data including threat level data carried by the access control smartcard with version information of configuration data including threat level data applied by the access control device;
(d) in the case that the version information for the configuration data including threat level data carried by the access control smartcard supersedes version information of configuration data including threat level data applied by the access control device, selectively applying the configuration data including threat level data carried by the access control smartcard to the access control device; and
(e) in the case that the version information for the configuration data including threat level data carried by the access control device supersedes version information of configuration data applied by the access control smartcard, writing the configuration data including threat level data carried by the access control device to the access control smartcard, and configuring the access control smartcard to cause a further disconnected access control device of the host access control system to, following presentation of the access control smartcard to the further disconnected access control device, selectively apply the written configuration data including threat level data; and
the access control device subsequently performing the authorization/authentication process to determine whether or not access should be granted based on the presentation of the access control smartcard, using configuration data including threat level data current applied by the access control device.

2. A method according to claim 1 wherein writing the configuration data including threat level data carried by the access control device to the access control smartcard includes:
(i) determining whether the configuration data to be applied is complete; and
(ii) only applying the configuration data in the event that it is complete.

3. A method according to claim 2 wherein determining whether the configuration data to be applied is complete includes taking a hash of the configuration data to be applied.

4. A method according to claim 1 wherein the configuration data includes access permissions for one or more users.

5. A method according to claim 1 wherein the automated process further comprises: in the case that the configuration data including threat level data carried by the access control smartcard is successfully applied to the access control device, writing data indicative of the successful application to the access control smartcard, and configuring the access control smartcard to cause a further device of the host system, being a device in communications with a server device of the host system, to communicate the indicative of the successful application to the server following presentation of the access control smartcard to the further connected device.

6. A method according to claim 1 wherein the version information is defined by a timestamp.

7. An access control device configured for operation as part of a host access control system without a communication channel to the host access control system, the access control device comprising:
- a communications port configured to read access control smartcards, including an access control smartcard that carries data comprising: (i) user credential data configured to enable an authorization/authentication process to determine whether or not access should be granted in response to presentation of the access control smartcard; and (ii) configuration data including threat level data;
- a memory module for maintaining software instructions; and
- a processor for executing the software instructions;
- wherein the access control device is configured to:
  - operate in a disconnected mode, wherein the access control device does not have a network connection to any other devices of the host access control system, and whilst in the disconnected mode, in response to reading an access control smartcard with configuration data including threat level data, perform an automated process comprising:
    - determining version information for the configuration data including threat level data carried by the access control smartcard;
    - comparing the version information of the configuration data including threat level data carried by the access control smartcard with version information of configuration data including threat level data applied by the access control device;
    - in the case that the version information for the configuration data including threat level data carried by the access control smartcard supersedes version information of configuration data including threat level data applied by the access control device, selectively applying the configuration data including threat level data carried by the access control smartcard to the access control device, wherein the access control device uses the configuration data including threat level data to determine at least part of the functionality of the access control device including threat-level specific functionality of a given authorization/authentication process to determine whether or not access should be granted; and
    - in the case that the version information for the configuration data including threat level data carried by the access control device supersedes version information of configuration data including threat level data applied by the access control smartcard, write the configuration data including threat level data carried by the access control device to the access control smartcard, and configuring the access control smartcard to cause a further access control device of the host access control system to, following presentation of the access control smartcard to the further access control device, selectively apply the written configuration data including threat level data; and
    - subsequently performing the authorization/authentication process to determine whether or not access should be granted based on the presentation of the access control smartcard, using configuration data including threat level data current applied by the access control device.

8. An access control device according to claim 7 wherein writing the configuration data the configuration data carried by the access control smartcard to the access control device includes:
- (iii) determining whether the configuration data to be applied is complete; and
- (iv) only applying the configuration data in the event that it is complete.

9. An access control device according to claim 8 wherein determining whether the configuration data to be applied is complete includes taking a hash of the configuration data to be applied.

10. An access control device according to claim 7 wherein the access control device includes an access control device, and the configuration data includes access permissions for one or more users.

11. A access control device according to claim 7 wherein the automated process further comprises: in the case that the configuration data including threat level data carried by the access control smartcard is successfully applied to the access control device, writing data indicative of the successful application to the access control smartcard, and configuring the access control smartcard to cause a further device of the host system, being a device in communications with a server device of the host system, to communicate the indicative of the successful application to the server following presentation of the access control smartcard to the further connected device.

12. An access control device according to claim 7 wherein the version information is defined by a timestamp.

13. A method for managing configuration data including threat level data in a host system including one or more connected devices that are connected to a host system network and one or more access control devices that are not connected to the host system network, the method comprising:
- at an access control device, whilst operating in a disconnected mode wherein the device does not have a network connection to any other devices, reading configuration data including threat level data from an access control smartcard, wherein the access control smartcard is a smartcard or a portable memory device, and based on a version control protocol selectively either: (i) apply the read configuration data including threat level data to the access control device, wherein the access control device uses the configuration data including threat level data to determine at least part of the functionality of the access control device including threat-level specific functionality of a given authorization/authentication process to determine whether or not access should be granted; or (ii) write configuration data including threat level data stored at the access control device to the access control smartcard, and in the case that the read configuration data including threat level data is selectively applied to the access control device, writing data indicative of that application to the access control smartcard;
- at the access control device, subsequently performing an authorization/authentication process to determine whether or not access should be granted based on the presentation of the access control smartcard, using configuration data including threat level data current applied by the access control device; and
- at a connected device, reading from the access control smartcard data indicative of successful application of configuration data including threat level data to one or more access control devices, and propagating that data to a central controller of the host system;

wherein in the case of (ii), configuring the access control smartcard to cause a further access control device of the host access control system to, following presentation of the access control smartcard to the further access control device, selectively apply the written configuration data including threat level data.

* * * * *